(12) United States Patent
Lucchesini et al.

(10) Patent No.: US 7,520,470 B2
(45) Date of Patent: Apr. 21, 2009

(54) AIRCRAFT CONFIGURATION WITH IMPROVED AERODYNAMIC PERFORMANCE

(76) Inventors: Massimo Lucchesini, Via Cassini, 23, Barasso (Varese) (IT); Pierclaudio Iaia, Via Monte Tabor 7, Varese (IT)

( * ) Notice: Subject to any disclaimer, the term of this patent is extended or adjusted under 35 U.S.C. 154(b) by 0 days.

(21) Appl. No.: 10/491,327

(22) PCT Filed: Mar. 27, 2002

(86) PCT No.: PCT/EP02/03683

§ 371 (c)(1),
(2), (4) Date: Sep. 23, 2004

(87) PCT Pub. No.: WO03/035467

PCT Pub. Date: May 1, 2003

(65) Prior Publication Data

US 2005/0029402 A1 Feb. 10, 2005

(30) Foreign Application Priority Data

Oct. 18, 2001 (IT) .......................... MI2001A2170

(51) Int. Cl.
*B64C 23/06* (2006.01)
(52) U.S. Cl. ................. 244/199.1; 244/199.4
(58) Field of Classification Search ................. 244/198, 244/199, 201, 87, 53 B; D12/319, 343, 337
See application file for complete search history.

(56) References Cited

U.S. PATENT DOCUMENTS

| | | | | |
|---|---|---|---|---|
| 3,285,542 A | * | 11/1966 | Holmquist | .................... 244/91 |
| 3,583,661 A | * | 6/1971 | Stake | ........................ 244/53 B |
| 3,667,704 A | * | 6/1972 | Assmann | .................. 244/53 B |
| D256,791 S | * | 9/1980 | McComas et al. | .......... D12/333 |
| 4,739,957 A | | 4/1988 | Vess et al. | |
| 5,901,925 A | * | 5/1999 | McGrath et al. | .......... 244/45 A |
| 6,152,404 A | * | 11/2000 | Flaig et al. | .................. 244/199 |

OTHER PUBLICATIONS

Michael Taylor "Brassey's World Aircraft & Systems Directory" 1999 Brassey's, London, p. 144-145 and p. 113-114.

* cited by examiner

*Primary Examiner*—Tien Dinh
(74) *Attorney, Agent, or Firm*—Hedman & Costigan, P.C.

(57) ABSTRACT

An aircraft (10), in particular a trainer aircraft with improved aerodynamic performance, having a configuration able to keep a directional stability and a very good aerodynamic behaviour even at very high angles of attack, where, traditional configurations prove themselves inefficient. In particular, this configuration foresees a forebody (52) with variable section, optimised for high angle of attack flights, a LEX vortex control device (72) at least one diverterless air intake (46), and a wing profile (18, 20) optimised in order to reduce the buffet effects typical of low aspect ratio wings with thin profile and variable camber. The aircraft (10) presents, finally, staggered tails (44 and 38), to optimise the aerodynamic performance.

12 Claims, 8 Drawing Sheets

AIRCRAFT CONFIGURATION WITH IMPROVED AERODYNAMIC PERFORMANCE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION (1) Field of the Invention

The present invention is related to an aircraft configuration with high aerodynamic performance; in particular the aircraft according to this invention is designed like a high performance trainer with secondary operational capabilities.

(2) Description of Related Art

Many aircraft have to be easily flown and must have peculiar dynamic characteristics in accordance with the mission to be carried out. Typical examples of the above include light aircraft for aerobatics, trainers, and combat aircraft.

These aircraft often have to fly at a high angle of attack (the angle between the aircraft and wind speed direction at any time). It is easy to understand that, under these flight conditions, the aircraft has to be very stable and easily controlled by the pilot, in order to maintain a safe attitude during flight. This stability is obtained using special automatic equipment able to generate forces and moments to counterbalance undesirable flight attitudes.

While the aircraft stability along the pitch axis can be controlled optimizing the static margin and time-to-double amplitude, the presence of lateral-directional instability (on "roll" and "yaw" axes) at high angles of attack can be difficult to control even using highly sophisticated Flight Control Systems. It is therefore necessary to maximize the aircraft lateral-directional stability up to high angles of attack in order to allow aircraft control/agility and to avoid flight departures and spins.

Usually, and in particular lately, attempts have been made by simply modifying the aerodynamic shape of the fuselage and other aircraft parts. Up to now those attempts have not led to successful results.

In the frame of the requirements listed above, one of the goals of the present invention is, therefore, to avoid the mentioned problems and, in particular, the problem relevant to an aircraft configuration with improved aerodynamic performance, able to optimize the aircraft behavior especially during high angle of attack flights.

Another goal of the present invention is to present an aircraft configuration with improved aerodynamic performance, able to reduce buffet effects typical of low aspect ratio wings with thin profile and variable camber.

Another goal of the present invention is to realize an aircraft configuration with high aerodynamic performance, able to avoid successfully the loss of lateral-directional stability and the negative effects generated by the engine flow next to the fuselage side wall and the horizontal tail, as far as drag, stability and longitudinal control are concerned.

An additional goal of the present invention is to realize an aircraft configuration with improved aerodynamic performance, able to recover from spin, optimizing, in general, the aircraft behavior at high angles of attack.

BRIEF SUMMARY OF THE INVENTION

These and other goals are met by an aircraft configuration with improved aerodynamic performance wherein the aircraft has a fuselage (12) fitted with wings (18, 20), at least one air intake (46) and a fuselage forebody (52) with a varying profile starting from the apex (74) up to the edge coupling which is a roughly circular section to the LEX apex and at the LEX apex a chinned section, said aircraft (10) also having a LEX vortex control device (72) at mid/high angles of attack and staggered tails (44 and 38), obtained by coupling the vertical fin to the wing (18, 20), whose leading edges (36) overlap the tailing edges (70) of each wing (18, 20), in order to optimize the aerodynamic performance.

Preferably, the subject aircraft of the present invention is designed, in particular, like a trainer with high performance and secondary operational capabilities. The configuration includes a twin engine "formula" and it is characterized by the presence of a range of very peculiar structural details.

The twin-seat cabin (in tandem) with interconnected flight controls is coupled with a forebody (52) with basically circular and variable section, characterized by low aspect ratio, optimized for high angles of attack flights. In this space, radar for the aircraft operational version can be easily integrated.

The forebody shape and dimensions are optimized in order to reduce its vortex interference on the aircraft aerodynamic characteristics at mid/high angles of attack. These characteristics reduce the directional asymmetries at high angles of attack, typical of forebody with circular or elliptical section.

Moreover the wing profile of an aircraft configured in accordance with the present invention is different from the standard wing profiles, in order to integrate a system able to minimize the buffet effects, typical of low aspect ratio wings with thin profile and variable camber.

The aerodynamic design also includes a LEX (Leading Edge Extension) vortex control device, properly sized, in order to make symmetrical the LEX vortex bursting at mid/high angles of attack. This symmetric vortex bursting allows the lateral-directional stability and the aircraft control to be maintained at mid/high angles of attack.

The training aircraft under this patent has at least one engine air intake able to guarantee the performance and a proper fluid-dynamic interface with the engine. The design does not foresee the integration of a typical diverter on the upper lip of an air intake, integrated with a LEX.

Finally, the horizontal tail staggering allows for a decrease in the aerodynamic drag produced by the fuselage afterbody, to optimize the aircraft spin behavior and to improve the aircraft aerodynamic design for high angles of attack maneuvers.

BRIEF DESCRIPTION OF THE DRAWINGS

Further goals and benefits of this patent shall be clear from the following description and from the attached drawings, provided solely to illustrate the present invention without limiting the invention in any manner, as follows.

DETAILED DESCRIPTION

Figure 1:
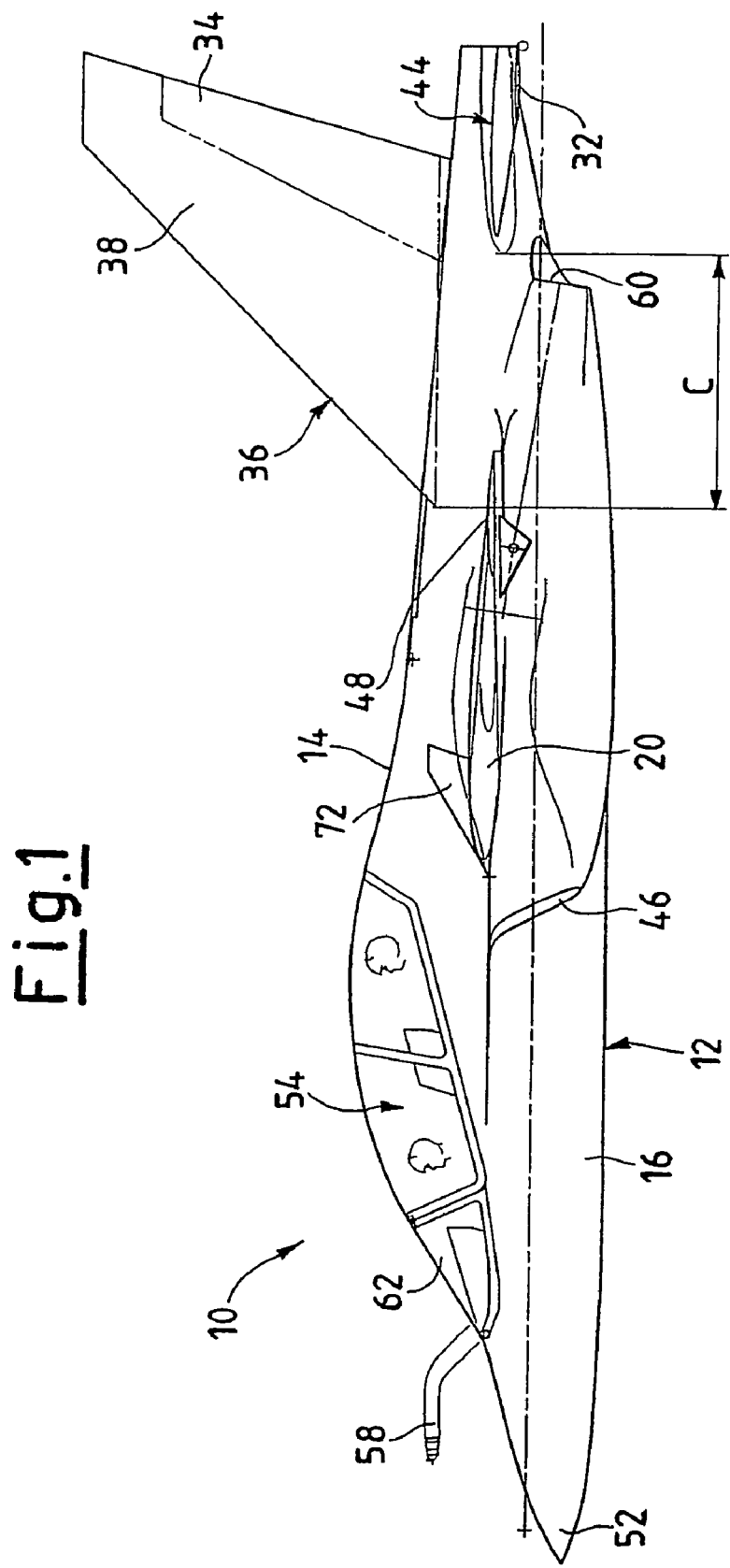
FIG. 1 is a side view of an aircraft, in particular of a trainer aircraft, designed according to the present invention.

Making reference to the attached drawing Figures, an aircraft, in particular a trainer aircraft, having a configuration with improved aerodynamic performance, accordingly to the present invention, is generally indicated with reference 10. The aircraft 10 includes a fuselage 12, having an upper side wall 14 and a lower side wall 16, and two wings, respectively a right wing 18 and a left wing 20, fitted to the fuselage 12.

The right wing 18 has the tip 22, while the left wing 20 has the tip 24. The aircraft 10 features also a rudder 34, fitted to the vertical fin 38 and a horizontal stabilizer 44 having a right horizontal stabilizer 26 and a left horizontal stabilizer 28 with respective tips 30, 32.

In the preferred embodiment, but not limiting the present invention, as already mentioned above, the configuration shown in the drawing Figures is a twin-engine design which includes two air intakes 46 for the engines 48, with relative engine nozzles 60.

Finally, radar for the operational version of the aircraft 10 could be integrated in the fuselage forebody area 52, with a two in tandem pilot cockpit 54 having interconnected flight controls, protected by a windshield 62. A probe 58 could also be included, in order to carry out in-flight refueling for the aircraft 10.

Figure 2:
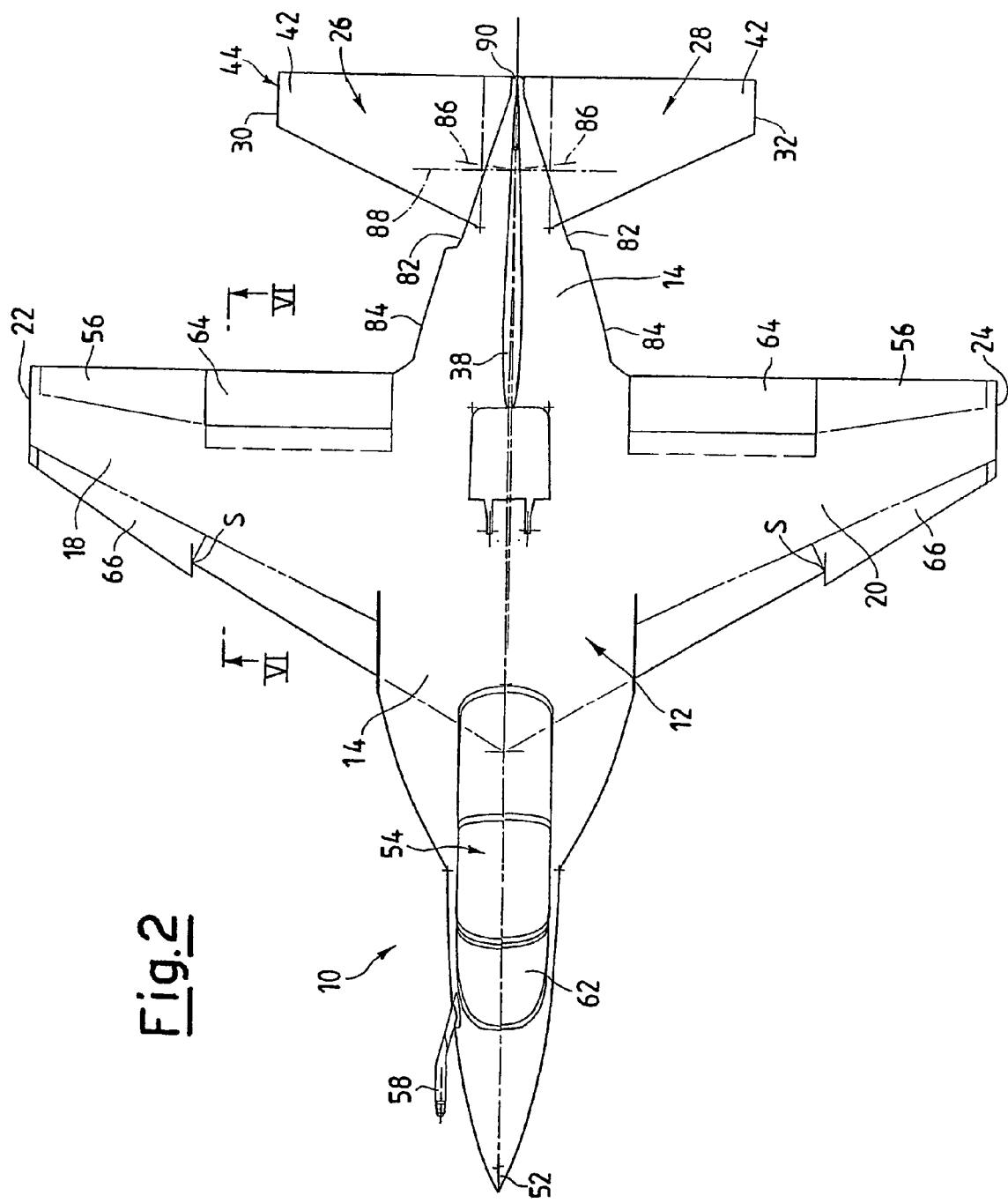
FIG. 2 is a top view of an aircraft, in particular of a trainer aircraft, designed according to the present invention.
Figure 3:
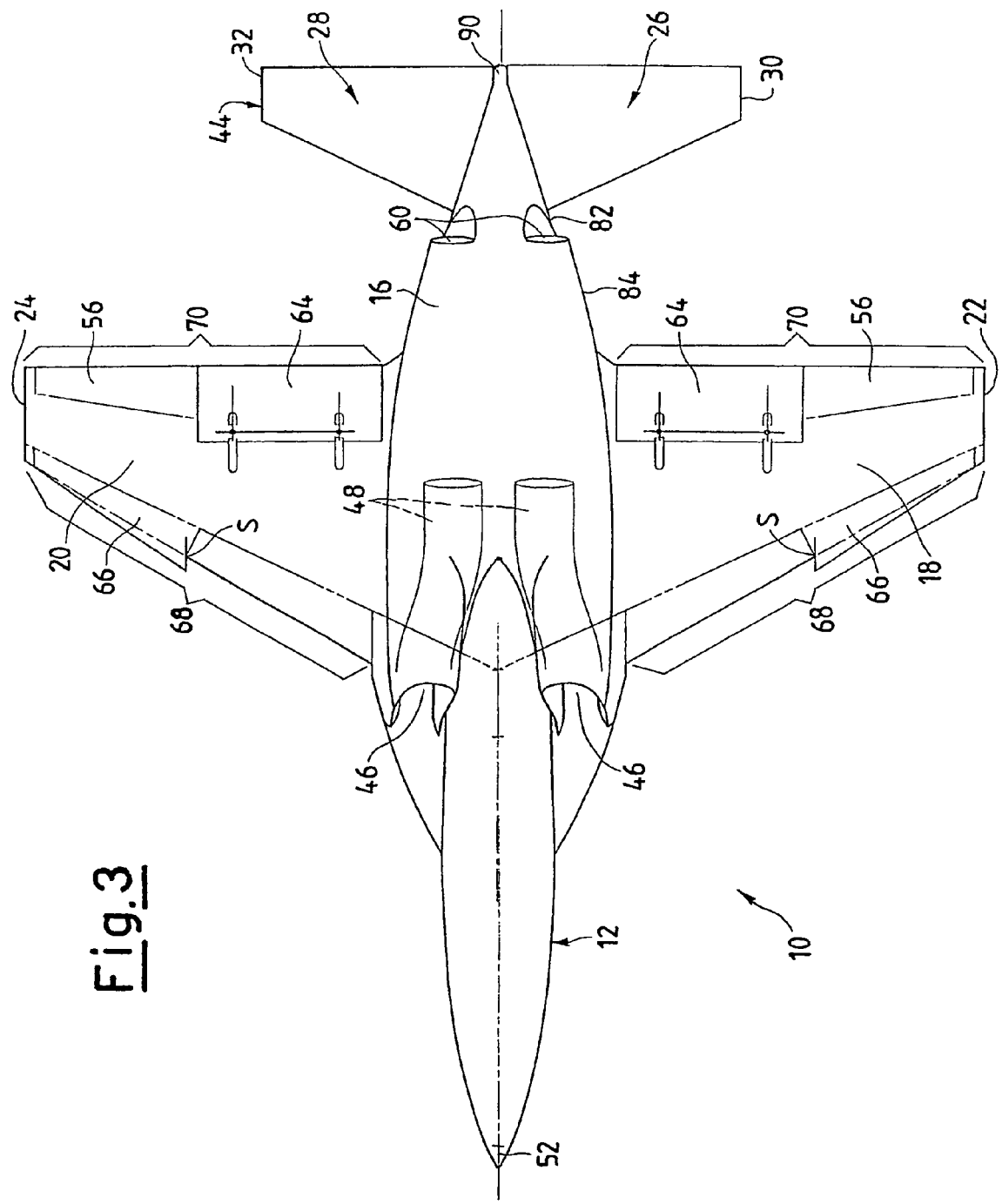
FIG. 3 is a bottom view of an aircraft, in particular of a trainer aircraft, designed according to the present invention.
Figure 4:
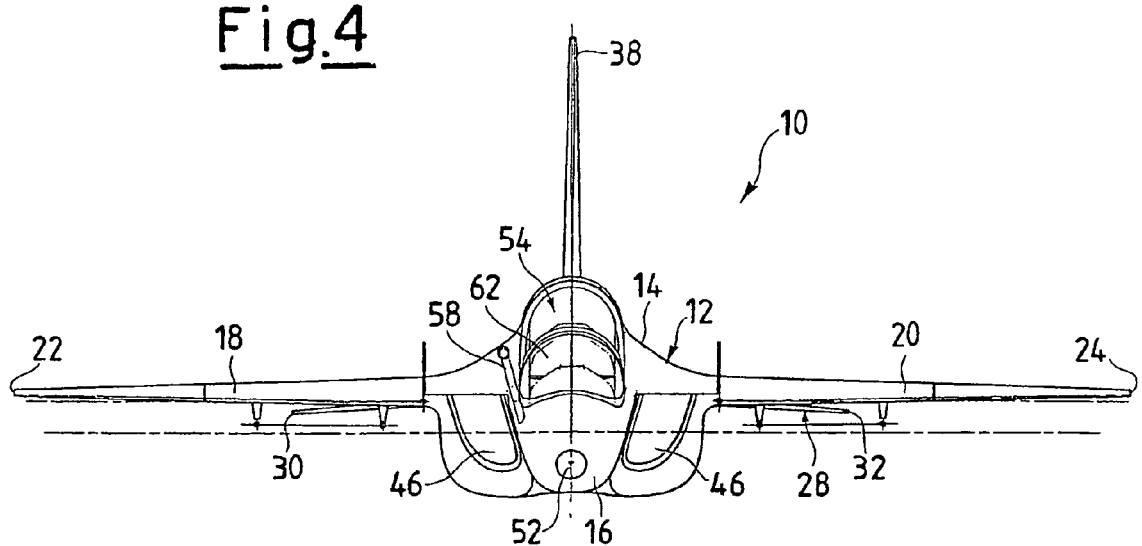
FIG. 4 is a front view of an aircraft, in particular of a trainer aircraft, designed according to the present invention.
Figure 5:
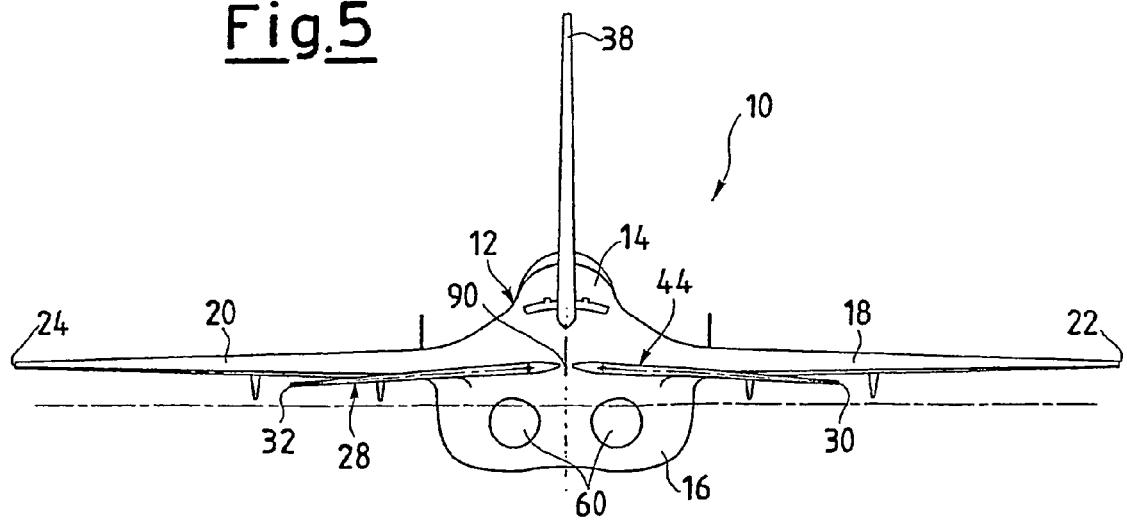
FIG. 5 is a back view of an aircraft, in particular of a trainer aircraft, designed according to the present invention.

With reference to FIGS. 2 and 3, each wing 18, 20 of the aircraft 10 includes outer ailerons 56 and take-off and landing double slotted flaps 64, integrated in the trailing edge 70 of each wing 18, 20. Other devices for wing camber optimization, including leading edge droops 66, are integrated in the wing leading edge 68. Their profile is shaped following a particular geometry, on the basis of the general aerodynamic design mentioned in this description.

In particular, the technical characteristics of the aircraft 10, aimed to obtain high aerodynamic performance and flight stability, according to the present invention, are as follows.

First, the aerodynamic design is characterized by the presence of an LVC ("LEX Vortex Controller") device to control the LEX ("Leading Edge Extension") vortex at mid/high angles of attack (FIG. 1, reference character 72). The LEX, with a gothic platform equal to 6.4% of the reference wing gross area (in accordance with the present invention), allows vortex lift generation at high angles of attack. LEX design is further refined integrating the LVC at its tip, in order to ensure the vortex symmetric bursting at high angles of attack for sideslip attitudes and to prevent loss of lateral-directional stability.

The size of the LEX vortex controller 72 depends on the size of the front LEX. In any case, the bigger the LEX is, the higher the LVC must be; the tolerance can be defined by the ratio between the LEX area and the height of the corresponding LVC. The design point of this ratio is equal to 2.35 m and the applicable tolerance range varies from 100% greater than, or 200% of, to 50% less than, or 50% of, the ratio from the design point.

The shape of the fuselage forebody 52 of the aircraft 10 and its dimensions are even further optimized in order to reduce its vortex interference on the aerodynamic characteristics of the aircraft 10 at mid/high angles of attack. The characteristics also allow the directional asymmetries at high angles of attack to be reduced, typical for the forebody with standard circular or elliptical sections.

The forebody 52 of the aircraft 10, according to the present invention, shows a range of forebody sections with different geometry starting from the apex 74 up to the forebody edge merging with the LEX apex.

Exemplary and preferred, but not limiting, geometric shapes of the sequence of sections between the apex 74 and a section referred to the quote 76 (positioned more or less at the beginning of the twin-seat cabin 54), is presented in sequence at FIGS. 8-17. From these Figures it can be inferred that from a roughly low aspect ratio circular section (FIGS. 8-11) a chined section is provided (FIGS. 12-17).

Figure 17:
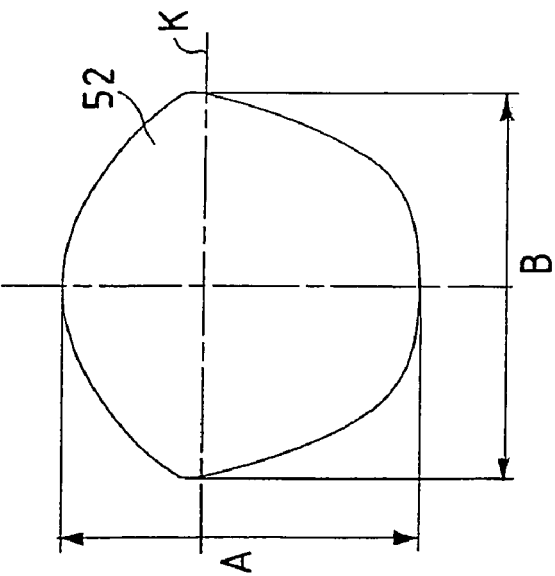
FIG. 17 is a section along XVII-XVII line of FIG. 7.
Figure 7:
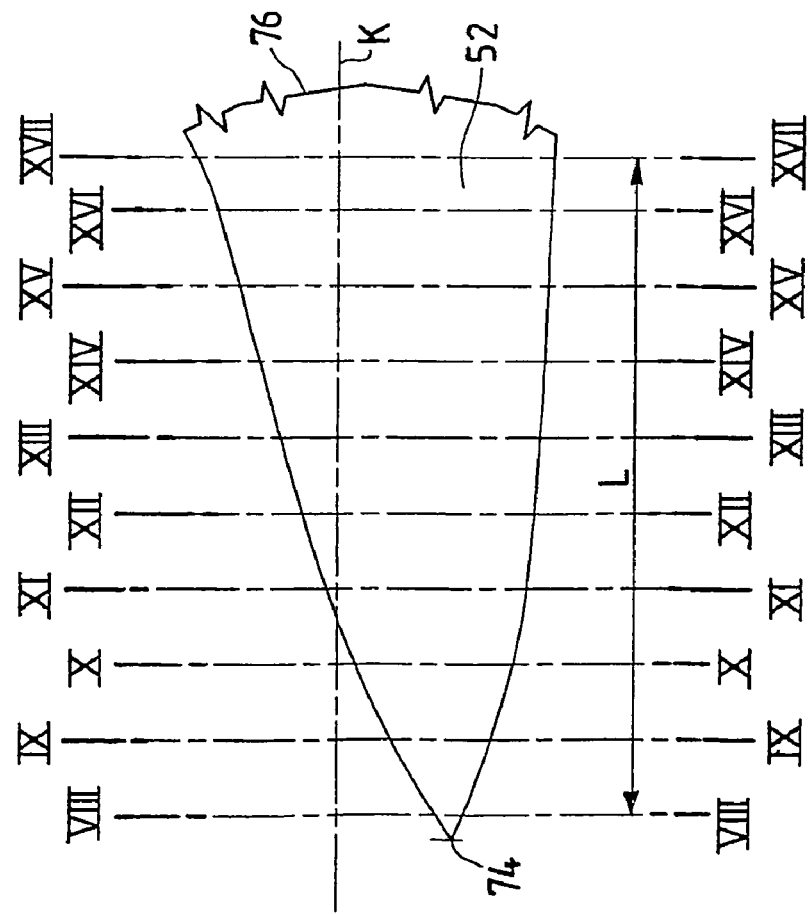
FIG. 7 is a partial and enlarged view of a detail of the aircraft configuration designed according to the present invention.
Figure 8:
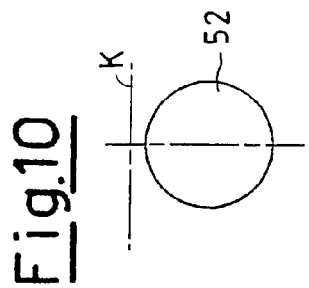
FIG. 8 is a section along the VIII-VIII line of FIG. 7.
Figure 9:
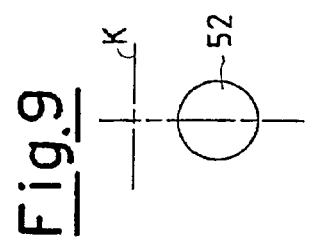
FIG. 9 is a section along IX-IX line of FIG. 7.
Figure 10:
FIG. 10 is a section along X-X line of FIG. 7.
Figure 11:
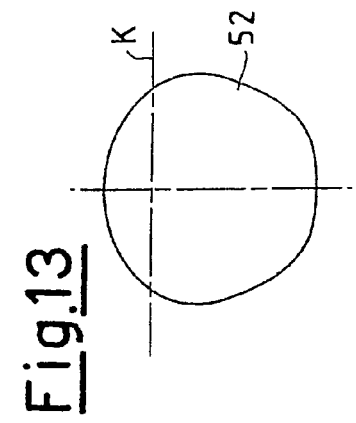
FIG. 11 is a section along XI-XI line of FIG. 7.
Figure 12:
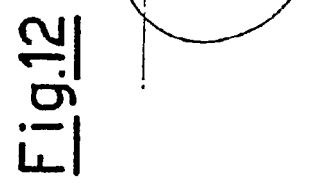
FIG. 12 is a section along XII-XII line of FIG. 7.
Figure 13:
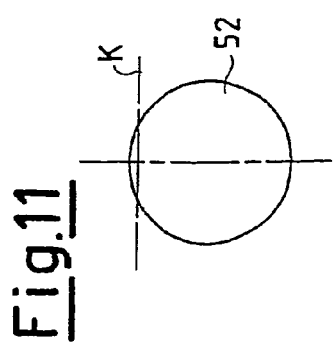
FIG. 13 is a section along XIII-XIII line of FIG. 7.
Figure 14:
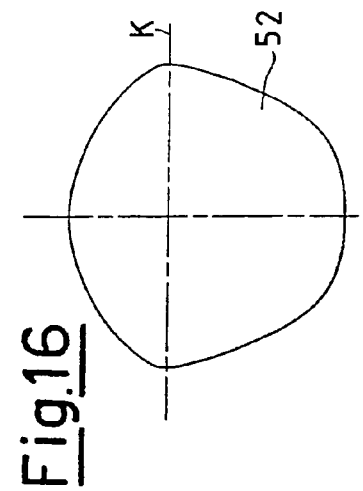
FIG. 14 is a section along XIV-XIV line of FIG. 7.
Figure 15:
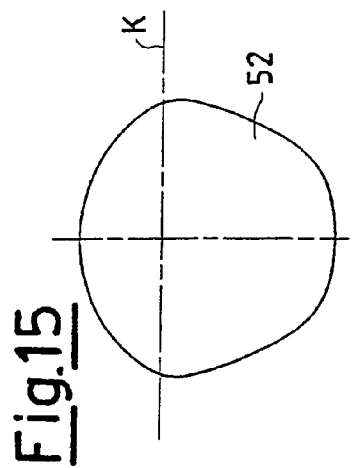
FIG. 15 is a section along XV-XV line of FIG. 7.
Figure 16:
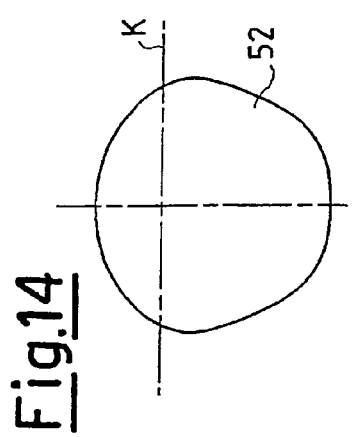
FIG. 16 is a section along XVI-XVI line of FIG. 7.

The mentioned drawing Figures make clear the shift of the forebody 52 from the longitudinal axis K, from the apex 74 up to the reference section presented in FIG. 17. In particular, according to a preferred embodiment of the present invention, the ratio between the length of the forebody 52, starting from the apex 74 up to the section along the XVII-XVII line (reference L), and the average between the lengths A and B of the two axes of the section (section shown in FIG. 17), presents a value of 1.873, with a tolerance equal to ±10%.

The structural peculiarity and its effect on the flight conditions come out from the combination of the parameter mentioned above (plus or minus the tolerance, if any) and the sequence of the forebody 52 sections, from the apex 74 of the aircraft 10 up to the reference section along XVII-XVII line.

Figure 18:
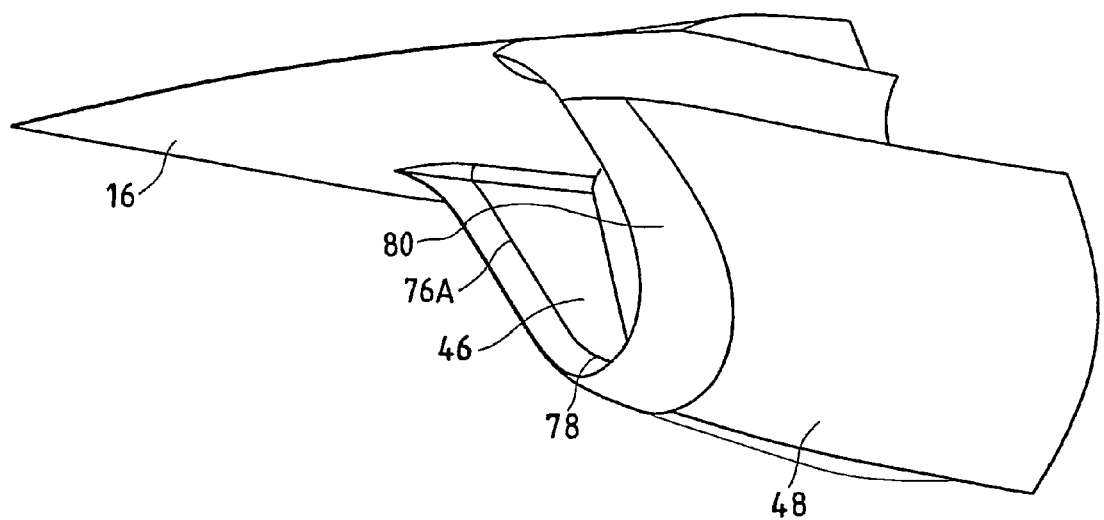
FIG. 18 is an enlarged isometric view of a detail of the aircraft configuration designed according to the present invention.

FIG. 18 shows in detail an engine air intake, indicated as item 46, which contributes to guarantee the performance of aircraft 10, above all as far as the fluid-dynamic interface with the relevant jet engine is concerned.

The air intake 46 shows a variable leading edge radius optimized in the lower part in order to reduce the engine face flow distortion at high angles of attack and in the side part in order to reduce the transonic spillage drag.

In particular, the inner lip average leading edge radius 76A is equal to 7 mm, while the lower lip average leading edge radius 78 is equal to 17.5 mm and that of the outer lip 80 is equal to 14 mm. Thus, in the preferred embodiment the capture area of the air intake 46 is about 0.322 $m^2$, and the throat area of the air intake 46 is about 0.257 $m^2$, with the engine face area being about 0.273 $m^2$ (these values referring to one air intake 46).

The air intake 46 is diverter-less on the upper side of each air intake side and is integrated with a LEX, thanks to the peculiar ratio between LEX length and shape. The LEX effectively acts as a shield at high angles of attack.

The air intake 46 can also include two additional blow indoors (not showed in the Figures), positioned on the upper wing-body junction between wings 18, 20 and fuselage 12, which open when the pressure in the duct is lower than pressure on the upper wing-body junction. The blow indoors use pre-loaded springs integrated in the blow indoor hinges. The blow indoors hinges aim to reduce, when they open, the local angles of attack on the air intake lips 46 at high angles of attack, reducing the air mass flow quantity passing through the above mentioned air intake 46.

One of the characteristics that guarantee the high performance, the stability and the aerodynamic structure of the aircraft 10 is the staggered tails 44 and 38. They reduce the aerodynamic drag generated by the fuselage afterbody, to optimize the spin behavior of the aircraft 10 and to improve its whole aerodynamic design for high angles of attack flights.

The vertical fin 38 with trapezoidal platform includes the rudder 34 and is coupled to the wing. This means that the leading edge of the vertical fin 38, indicated by reference character 36 in FIG. 1, overlaps the trailing edges 70 of each wing 18, 20. This configuration allows for the recovery from spin and to optimize the behavior of the aircraft 10 at high angles of attack.

The horizontal stabilizer 44 with trapezoidal platform is moved by two independent actuators which allow its symmetric and asymmetric deflection. The horizontal stabilizer 44 presents a hinge axis, indicated by reference character 86 in FIG. 2, which is oriented, on the right and on the left, at about 7.5° from a lateral axis 88, in order to optimize the hinge and the inertial moments.

The staggered tails can be further characterized by a tolerance referred to as the ratio between quote C, as shown in FIG. 1 and defined as the distance between the apex of the vertical fin root chord and the apex of the horizontal tail root chord 44, and the tail arm, equal to 4181 mm. It follows that the reference ratio given above is equal to 1932/4181 mm, or 0.462, with an applicable tolerance equal to 10%.

Also, the wing profile is modified and optimized in comparison with traditional trainer aircraft, in order to reduce the "buffet" effect, considering the characteristics of a low aspect ratio wing with thin airfoil and variable camber.

According to the present invention, on the contrary, a wing 18, 20 with a trapezoidal platform and mid aspect ratio (AR=4) is used, characterized by the presence of a saw tooth (shown as S in FIG. 2) at 67.5% of the gross wing span. The modification, in comparison with standard wings, is first of all related to the leading edge radius, shown as R is FIG. 6, which was circular (prior art) and now becomes triangular in order to optimize the stagnation point position, in the presence of the leading edge 68 and of the "Leading Edge Droops" 66 deflected at mid angles of attack.

Figure 6:
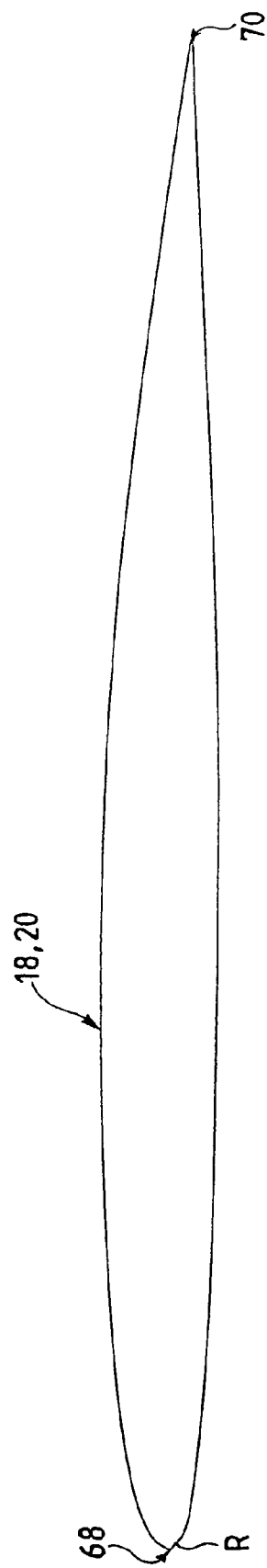
FIG. 6 is a section along the VI-VI line of FIG. 2.

As clearly results from the configuration of FIG. 6, which shows an enlarged section along VI-VI line of FIG. 2, each wing 18, 20 presents a variable camber profile, both along the leading edge 66 ("Leading Edge Droop") and along the trailing edge 70, near the ailerons 56. The ailerons 56 are scheduled only in transonic regime, to have a camber reduction in order to reduce compressibility effects.

Quantitatively, the design point of the chord percentage extension of the leading edge 68 is equal to 0.36% with a tolerance between +0.5% and −0.2% from the nominal value, while the design point of the gross wing span at which the chord extension is applied, in comparison with the standard solutions, is equal to 8.2%, with a tolerance between +10% and −5% from the nominal value.

Other characteristics of the aircraft 10 include the fuselage 12, which in the afterbody includes the integration of the engine nozzles 60 and the presence of a fuselage tail, indicated by reference character 90 in FIG. 3.

The area near the engine nozzles 60 is also optimized in order to reduce the negative effects, in terms of drag and longitudinal stability/control, generated by the engine flow next to the fuselage side wall 12 and the horizontal tail 44.

The aircraft 10 also features a tricycle landing gear, including a nose landing gear and a main landing gear. The nose landing gear is a leg strut, with four doors closing the bay, and backside retraction. The main landing gear has front side retraction in order to allow fuselage belly loads installation.

The aircraft 10 of the present invention fits an automatic flight control system ("Fly By Wire"), digital quadruplex redundant, which optimizes the performance and the flight qualities. The system improves the flight safety, limiting, automatically, flight regimes which could be uncomfortable to the pilot or could lead to lose control ("Carefree Handling"). From the above description, the characteristics of the aircraft configuration result in improved aerodynamic performance.

It is clear that other modifications can be applied to the structure of the subject aircraft, without exceeding the novelties included in the concept of the present invention. It is also clear that in applying the teachings of the subject invention, materials, shapes and dimensions of the above mentioned details could vary in compliance with the requirements and the same details could be replaced with other details having the same technical characteristics.

The invention claimed is:

1. Configuration of an aircraft (10) with improved aerodynamic performance, so as to maintain direction stability at mid/high angles of attack, said aircraft (10) having a fuselage (12) fitted with wings (18, 20) and leading edge extensions each leading edge extension ("LEX") having an area at least one air intake (46) and a fuselage forebody (52) with a tapering section, said aircraft (10) including a LEX vortex control device (72) shaped such as to make symmetrical the bursting of the vortex generated by a said LEX at mid/high angles of attack, wherein the ratio of the LEX area over the corresponding LEX vortex control device height is equal to 2.35m with a tolerance range varying from about 200% to about 50% of said ratio, said LEX vortex control device cooperating with staggered tails comprising a single vertical fin (38) and at least one horizontal stabilizer (44), obtained by coupling the vertical fin (38) to the wing (18, 20), wherein the leading edges (36) of the vertical fin (38) overlap the tailing edges (70) of each wing (18, 20), in order to maintain lateral-directional stability.

2. Configuration of an aircraft (10) as defined in claim 1, wherein the fuselage forebody (52) has a low aspect ratio.

3. Configuration of an aircraft (10) as defined in claim 1, wherein the staggered tails (44 and 38) are coupled by the vertical fin with trapezoidal platform to the wing (18, 20) and whose leading edges (36) overlap trailing edges (70) of each wing (18, 20).

4. Configuration of an aircraft (10) as defined in claim 3, wherein the horizontal stabilizer (44) comprises a trapezoidal platform and the capability of symmetrical and asymmetrical deflection, said horizontal tail having a hinge axis (86), along a lateral axis (88) of the aircraft (10), in order to optimize hinge and inertial moments.

5. Configuration of an aircraft (10) as defined in claim 3, wherein the air intake (46) has no diverter on the upper lip of the air intake.

6. Configuration of an aircraft (10) as defined in 1, wherein the air intake (46) has an inner lip average leading edge radius (76A) equal to 7 mm, while the lower lip average leading edge radius (78) is equal to 17.5 mm and that of the average outer lip (80) is equal to 14 mm, so that the capture area of the air intake (46) is about 0.322 m², the throat area is about 0.257 m² and the engine face area is about 0.273 m².

7. Configuration of an aircraft (10) as defined in claim 1, wherein each wing (18, 20) of the aircraft (10) has a trapezoidal platform and at least one saw tooth area (S) in at least one part of the wing span, said wing (18, 20) also having a leading edge (68) and radius (R) with a triangular profile.

8. Configuration of an aircraft (10) as defined in claim 1, wherein each wing (18, 20) of the aircraft (10) shows a variable camber profile, both on the leading edge (66) and on the trailing edge (70), in order to optimize camber profile for improved compressibility effects.

9. Configuration of an aircraft as defined in claim 1, wherein the LEX control device is substantially vertically oriented.

10. Configuration of an aircraft as defined in claim 1 wherein a LEX control device is located at about the tip of each LEX, where said LEX meets an adjacent wing.

11. Configuration of an aircraft as defined in claim 1 wherein a LEX control device is substantially vertically oriented at about the tip of said LEX, where said LEX meets an adjacent wing.

12. Configuration of an aircraft as defined in claim 1 wherein the ratio of the LEX area over the corresponding LEX vortex control device height is equal to about 2.35m.

* * * * *